United States Patent
Kim

(10) Patent No.: US 8,006,895 B2
(45) Date of Patent: Aug. 30, 2011

(54) APPARATUS AND METHOD FOR PROVIDING PAYMENT SERVICE IN MOBILE COMMUNICATION SYSTEM

(75) Inventor: Seon-Mi Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1042 days.

(21) Appl. No.: 11/803,606

(22) Filed: May 15, 2007

(65) Prior Publication Data

US 2007/0282745 A1 Dec. 6, 2007

(30) Foreign Application Priority Data

Jun. 2, 2006 (KR) .................. 10-2006-0049689

(51) Int. Cl.
*G06K 5/00* (2006.01)
(52) U.S. Cl. ..................... 235/379; 235/380
(58) Field of Classification Search .............. 235/379, 235/380; 705/70, 72, 75, 14.37, 14.38, 16, 705/44
See application file for complete search history.

(56) References Cited

U.S. PATENT DOCUMENTS

| | | | | |
|---|---|---|---|---|
| 6,612,488 | B2* | 9/2003 | Suzuki | 235/380 |
| 6,679,425 | B1* | 1/2004 | Sheppard et al. | 235/382 |
| 6,859,650 | B1* | 2/2005 | Ritter | 235/380 |
| 7,182,254 | B2* | 2/2007 | Changryeol | 235/380 |
| 7,184,747 | B2* | 2/2007 | Bogat | 455/406 |
| 2002/0052842 | A1* | 5/2002 | Schuba et al. | 705/40 |
| 2003/0055675 | A1* | 3/2003 | Klein Twennaar | 705/1 |
| 2005/0097038 | A1* | 5/2005 | Yu et al. | 705/40 |

FOREIGN PATENT DOCUMENTS

| | | |
|---|---|---|
| KR | 1020000049648 | 8/2000 |
| KR | 1020010008255 | 2/2001 |
| KR | 1020010016177 | 3/2001 |
| KR | 1020020081832 | 10/2002 |

* cited by examiner

*Primary Examiner* — Thien M Le
(74) *Attorney, Agent, or Firm* — The Farrell Law Firm, P.C.

(57) ABSTRACT

An apparatus and a method for providing payment service in a mobile communication system. According to the method, when an event for processing a credit payment is detected, a first FACILITY message requesting a credit payment process is created and transmitted to a mobile communication network. Accordingly, a portable terminal can provide a credit payment service even if it does not have a communication module or chip for payment processing.

23 Claims, 8 Drawing Sheets

APPARATUS AND METHOD FOR PROVIDING PAYMENT SERVICE IN MOBILE COMMUNICATION SYSTEM

PRIORITY

This application claims priority under 35 U.S.C. §119 to an application entitled "APPARATUS AND METHOD FOR PROVIDING PAYMENT SERVICE IN MOBILE COMMUNICATION SYSTEM" filed in the Korean Intellectual Property Office on Jun. 2, 2006 and assigned Serial No. 2006-49689, the contents of which are incorporated herein by reference.

BACKGROUND OF THE INVENTION

1. Field of the Invention

The present invention relates generally to an apparatus and a method for providing payment service in a mobile communication system, and more particularly, to an apparatus and a method for providing payment service between portable terminals using a FACILITY message.

2. Description of the Related Art

Recently, portable terminals have become miniaturized and the demand for these portable terminals has increased. Moreover, these portable terminals have begun to incorporate additional functions such as a financial payment service.

Typically, the financial payment services provided by portable terminals provide a function of processing various financial payments using a close distance communication module such as an Infrared Data Association module (IrDA), a Bluetooth module, and/or an a semiconductor chip containing credit card data. Also, portable terminals provide a function of processing a financial payment using a rate of a portable terminal when a user selects the portable terminal as a method of processing the financial payment via the Internet.

As described above, the financial payment service provided by portable terminals according to conventional methods requires a communication module such as the above-described IrDA or Bluetooth module, and/or additional chip. Accordingly, a user is inconvenienced by having to purchase a portable terminal having the communication module and/or chip, or by having to separately mount the communication module and/or chip in order to use the financial payment service. Also, in the case where the portable terminal provides financial payment service via the Internet, the user is typically inconvenienced by having to perform the Internet access in advance for the financial payment. Also, since the financial payment service is not conventionally provided between portable terminals, a direct payment between users cannot be made.

SUMMARY OF THE INVENTION

An object of the present invention is to substantially solve at least the above problems and/or disadvantages and to provide at least the advantages below. Accordingly, an object of the present invention is to provide an apparatus and a method for providing payment service in a mobile communication system.

Another object of the present invention is to provide an apparatus and a method for providing payment service between portable terminals.

Further another object of the present invention is to provide an apparatus and a method for providing credit payment service between portable terminals using a FACILITY message used in a mobile communication system.

According to one aspect of the present invention, a method for providing payment service at a portable terminal includes, creating a first FACILITY message requesting a credit payment process is detected, when an event for processing a credit payment, and transmitting the first FACILITY message to a mobile communication network.

According to another aspect of the present invention, a method for providing payment service at a mobile communication system includes creating a first FACILITY message requesting payment data and transmitting the first FACILITY message to a calling terminal when a credit payment request message is received from the calling terminal, and receiving a second FACILITY message including the requested payment data from the calling terminal.

According to further another aspect of the present invention, a method for providing payment service at a mobile communication system includes receiving a first FACILITY message requesting confirmation of credit payment processing; and creating a second FACILITY message representing whether to agree with the credit payment processing to transmit the same to a mobile communication network.

According to yet another aspect of the present invention, an apparatus for providing payment service at a portable terminal includes a credit payment processing unit for detecting a credit payment processing unit, creating a FACILITY message corresponding to the credit payment processing event, and analyzing a received FACILITY message when the credit payment processing event is determined to have occurs; and a communication module for transmitting the FACILITY message to a credit payment network and receiving the FACILITY message from the credit payment network to output the same to the credit payment processing unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and a method for providing payment service between portable terminals using a FACILITY message in a mobile communication system will be described in detail. Here, the FACILITY message is a message exchanged between a terminal and a system in order to perform an additional service (or services) which are currently not defined.

According to the present invention, though a portable terminal of a calling party can pay for a portable terminal of a called party or request the portable terminal of the called party to pay using a credit payment service, the case where the portable terminal of the calling party will pay for the portable terminal of the called party will be described. Also, in the following description, a credit payment network includes a mobile communication network or a network including a mobile communication network and a separate payment network (e.g., a credit card network and a bank network) associated with each other.

Figure 1:
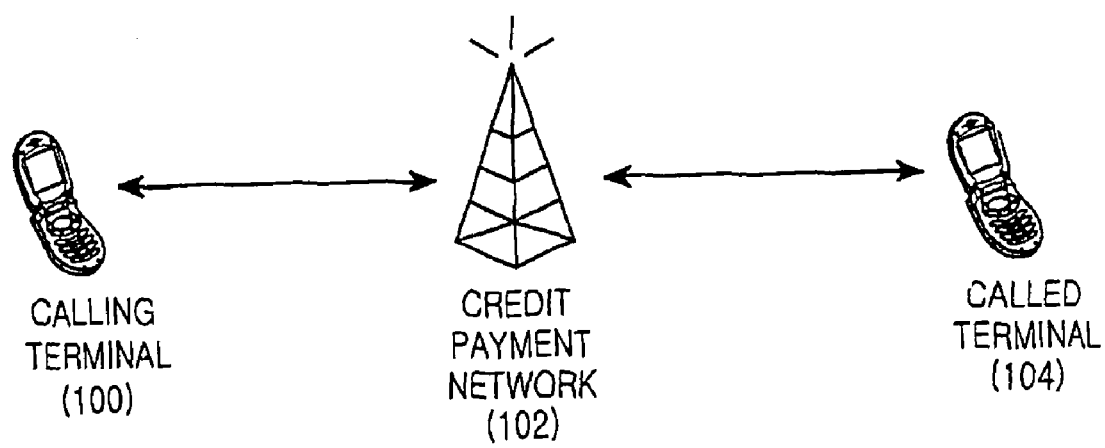
FIG. 1 is a block diagram illustrating a system for providing payment service between portable terminals according to the present invention.

FIG. 1 is a block diagram illustrating a system for providing payment service between portable terminals according to the present invention. Here, the system includes a calling terminal 100, a credit payment network 102, and a called terminal 104.

Referring to FIG. 1, the calling terminal 100 requests the credit payment network 102 to perform a payment processing in order to pay the called terminal 104 a predetermined sum (amount) of money (which will also be referred to as a payment). After that, when data of (i.e., information corresponding to) one or more payment processing methods for paying the called terminal 104 a predetermined amount of money are received from the credit payment network 102, the calling terminal 100 selects a predetermined payment processing method from the received one or more payment processing methods, and requests the credit payment network 102 to pay the called terminal 104 predetermined amount of money. After that, when the called terminal 104 agrees to receive the predetermined amount of money, the calling terminal 100 receives a signal indicating that the payment has been successfully performed from the credit payment network 102. On the other hand, when the called terminal 104 does not agree to receive the predetermined amount of money, the calling terminal 100 receives a signal indicating that the called terminal 104 has rejected the predetermined amount of money from the credit payment network 102.

When a payment request for paying the called terminal 104 a predetermined amount of money is made by the calling terminal 100, the credit payment network 102 transmits data regarding one or more payment processing methods to the calling terminal 100. After that, when a signal requesting the credit payment network 102 to pay the called terminal 104 the predetermined amount of money using a predetermined payment processing method is received from the calling terminal 100, the credit payment network 102 transmits data regarding the predetermined amount of money paid by the calling terminal 100 to the called terminal 104 to determine whether the called terminal 104 agrees to receive the predetermined amount of money. When the called terminal 104 agrees to receive the predetermined amount of money, the credit payment network 102 pays the called terminal 104 the predetermined amount of money using the payment processing method selected by the calling terminal 100, and informs the calling terminal 100 and the called terminal 104 that the payment of the predetermined amount of money has been made (i.e., is successful). On the other hand, when the called terminal 104 rejects to receive the predetermined amount of money, the credit payment network 102 informs the calling terminal 100 that the called terminal 104 has rejected receipt of the predetermined amount of money.

When a signal inquiring whether to agree to receive the predetermined amount of money to be paid by the calling terminal 100 is received from the credit payment network 102, the called terminal 104 transmits a message representing whether it agrees to receive the predetermined amount of money to the credit payment network 102.

Figure 2:
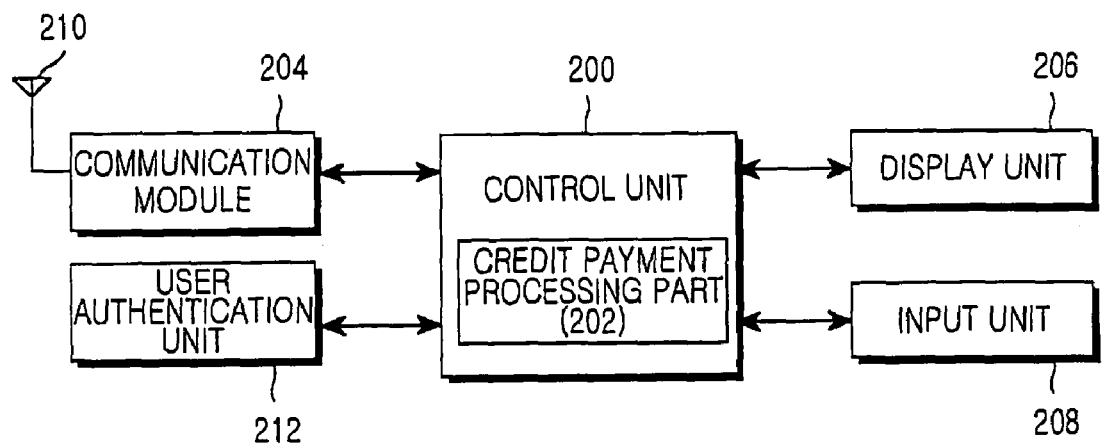
FIG. 2 is a block diagram illustrating a portable terminal according to the present invention.

FIG. 2 is a block diagram illustrating a construction of a portable terminal according to the present invention. Here, the portable terminal includes a control unit 200, a credit payment processing part 202, a communication module 204, a display unit 206, an input unit 208, an antenna 210, and a user authentication unit 212.

Referring to FIG. 2, the control unit 200 performs processing and a control for data communication and credit payment. Particularly, when a credit payment event occurs according to the present invention, the control unit 200 transmits a message requesting credit payment processing to the credit payment network 102 using the communication module 204, and controls a function of outputting contents of a message received from the credit payment network 102 via the communication module 204 to the display unit 206. Also, the control unit 200 includes a credit payment processing part 202 according to the present invention to create a FACILITY message corresponding to a credit payment function input or selected via the input unit 208, and analyzes a FACILITY message received from the credit payment network 102 via the communication module 204. Also, the control unit 200 provides a password input from the input unit 208 for user authentication to the user authentication unit 212, receives a user authentication result from the user authentication unit 212, and displays a message informing a user that the credit payment function cannot be used due to a user authentication failure on the display unit 206.

The communication module 204 transmits/receives wireless signals of data input/output via the antenna 210. For example, during transmission, the communication module 204 modulates baseband signals of data to be transmitted, converts the modulated baseband signals into radio frequency (RF) signals, and transmits the converted signals via the antenna 210. On the other hand, during reception, the communication module 204 converts received RF signals into baseband signals, and demodulates the baseband signals to receive the transmitted data. Particularly, according to the present invention, the communication module 204 transmits a FACILITY message input from the control unit 200 to the credit payment network 102, and outputs a FACILITY message received from the credit payment network 102 to the control unit 200.

The display unit 206 displays state data occurring during an operation of the portable terminal, a limited number of characters and/or graphic data. Particularly, according to the present invention, the display unit 206 displays a message received from the credit payment network 102 under control of the control unit 200. The display unit 206 can also include a touch sensitive screen such that it can also be used to input data.

The input unit 208 includes a plurality of function keys, and provides data corresponding to a key pressed by a user to the control unit 200. Particularly, according to the present invention, the input unit 208 receives data regarding the credit payment, that is, data of a counter-part's terminal for which payment is to be made, an amount of payment money, and a password for payment, and provides the data to the control unit 200.

The user authentication unit 212 performs user authentication by examining whether the password input from the control unit 200 coincides with a preset password, and outputs the results of the authentication the control unit 200.

Figure 3:
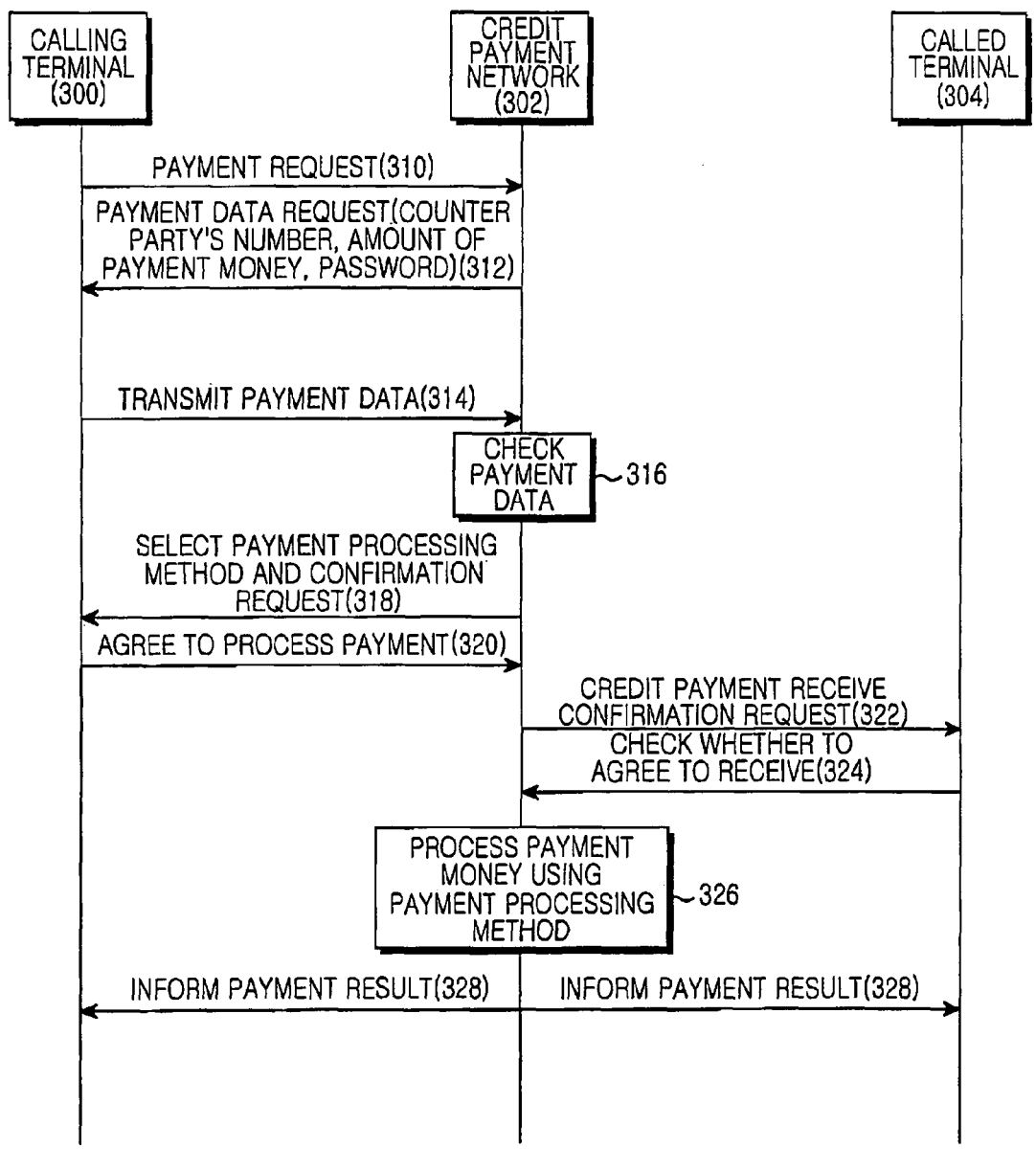
FIG. 3 is a flow diagram illustrating an operating procedure between a portable terminal and a credit payment network for inter-terminal credit payment according to the present invention.

FIG. 3 is a flow diagram view illustrating an operating procedure between a portable terminal and a credit payment network for inter-terminal credit payment according to the present invention.

Referring to FIG. 3, the calling terminal 300 transmits a message requesting credit payment processing to the credit payment network 302 to access the credit payment network 302 in a step 310. For example, the calling terminal 300 can request credit payment processing by transmitting a credit payment request message 701 (illustrated in the flow diagram of FIG. 7) to the credit payment network 302.

Figure 7:
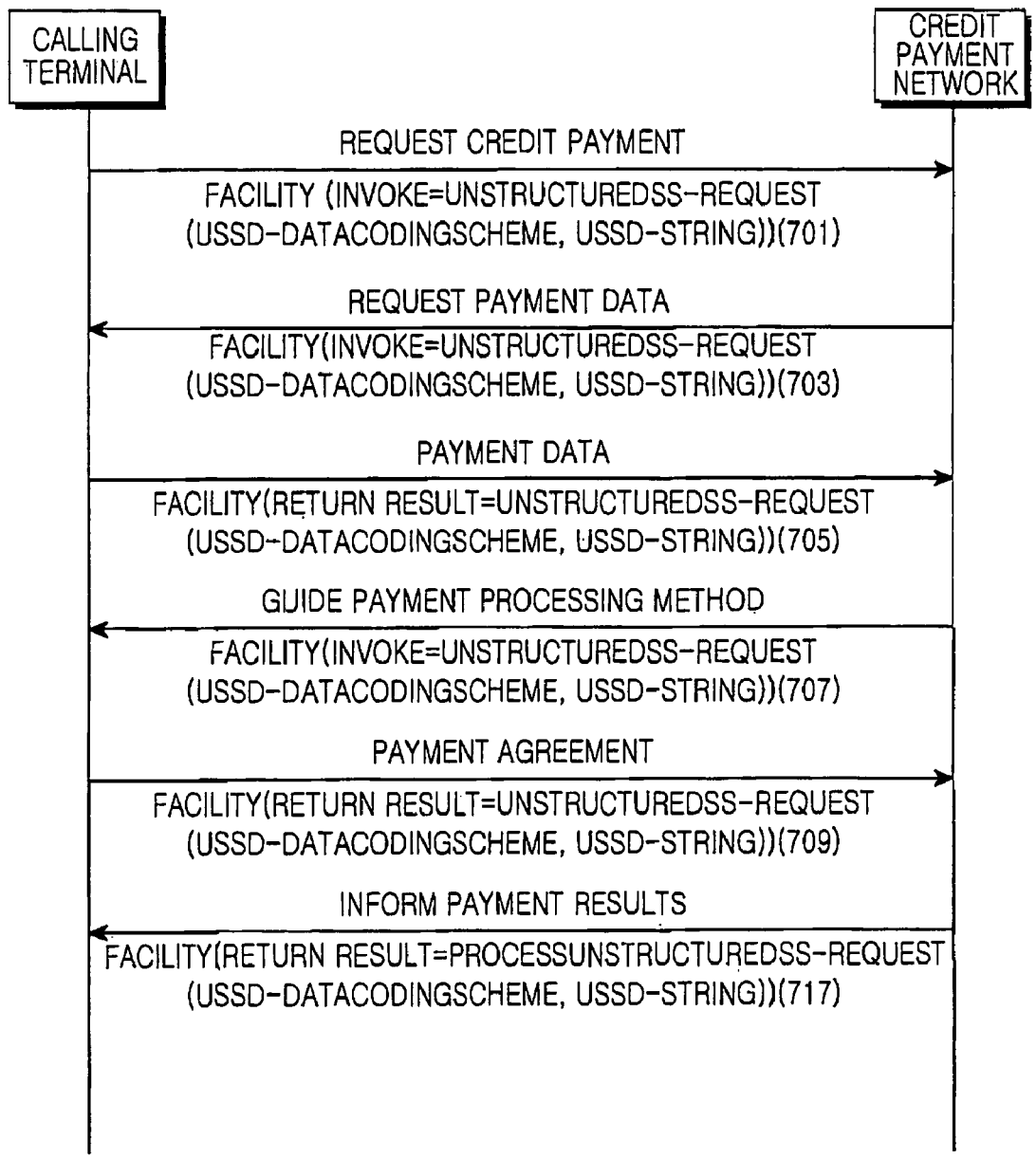
FIG. 7 is a flow diagram illustrating a FACILITY message transmitted/received between a calling terminal and a credit payment network according to the present invention.

After that, the credit payment network 302 requested by the calling terminal 300 to perform the credit payment processing transmits a message requesting data regarding the credit payment, that is, data regarding the called terminal 304, an amount of payment (and/or information related to a currency type, e.g., U.S. Dollar, Euro, etc.), and a password for payment to the calling terminal 300 in a step 312. For example, the credit payment network 302 transmits a payment data request message 703 (which is illustrated in FIG. 7) to the calling terminal 300.

After that, the calling terminal 300 that has received the credit payment data receives payment data such as information related to the called terminal 304, a payment amount, and/or a password from a user (i.e., a user of the calling terminal), and transmits the same to the credit payment network 302 in a step 314. For example, the calling terminal 300 transmits a payment data message 705 illustrated in FIG. 7 to the credit payment network 302. At this point, the calling terminal 300 may perform user authentication in order to request the credit payment.

After that, the credit payment network 302 checks whether the received data is correct in a step 316. Thereafter, in step 318, the credit payment network 302 transmits data regarding one or more payment processing methods for providing payment service between the calling terminal 300 and the called terminal 304 and requests the calling terminal 300 to select a predetermined payment processing method from the one or more payment processing methods. In other words, the credit payment network 302 transmits a message requesting the calling terminal 300 to select a payment method from, for example, a payment method using a rate of a terminal, a payment method using a predetermined bank account of a user, and a payment method using a credit (or debit) card in order to increase or decrease payment amount. For example, the credit payment network 302 may transmit a payment processing method guide message 707 (illustrated in FIG. 7) to the calling terminal 300 including a selected payment method.

The calling terminal 300 that has received data regarding the payment processing methods selects one of the one or more payment processing methods in step 320, and transmits a messaging agreeing to process the credit payment for the called terminal 304 using the selected payment processing method to the credit payment network 302. For example, the calling terminal 300 transmits a payment agreement message 709 (illustrated in FIG. 7) to the credit payment network 302.

After that, the credit payment network 302 that has received the payment agreement message 709 informs the called terminal 304 that the calling terminal 302 has requested payment processing for a predetermined payment amount, and transmits a message inquiring whether to receive the predetermined payment amount to the called terminal 304 in a step 322. For example, the credit payment network 302 transmits a payment reception confirmation request message 801 (illustrated in FIG. 8) to the called terminal 304.

At this point, the credit payment network 302 may request the called terminal 304 to transmit a password for user authentication in order to confirm reception of the predetermined amount. For example, the credit payment network 302 may request user authentication by transmitting a password request message 803 (illustrated in FIG. 8) to the called terminal 304.

After that, the called terminal 304 transmits a message representing whether to receive the predetermined amount to the credit payment network 302 in step c324. For example, the called terminal 304 transmits a reception agreement message 805 or a reception rejection message 807 (illustrated in FIG. 8) to the credit payment network 302.

After that, when the reception agreement message 805 for the predetermined amount is received from the called terminal 304, the credit payment network 302 pays (or credits) the predetermined amount of money between the calling terminal 300 and the called terminal 304 using the selected payment processing method in a step 326. For example, when the payment method using the rate (taxation) of the terminal is selected for paying the amount of money, the amount of money can be added to the rate of the calling terminal and a rate of the called terminal can be decreased by the predetermined amount of money. Also, when a user selects a payment method using a predetermined account of the user, or a payment method using a credit (or debit) card, the credit payment network 302 can add or subtract the predetermined amount in cooperation with a corresponding financial network or credit (or debit) card network.

After that, the credit payment network 302 transmits the payment processing result to the calling terminal 300 and the called terminal 304 in step 328. For example, the credit payment network 302 transmits messages 717 and 809 representing the payment processing results (illustrated in FIGS. 7 and 8) to the calling terminal 300 and the called terminal 304, respectively.

Figure 4:
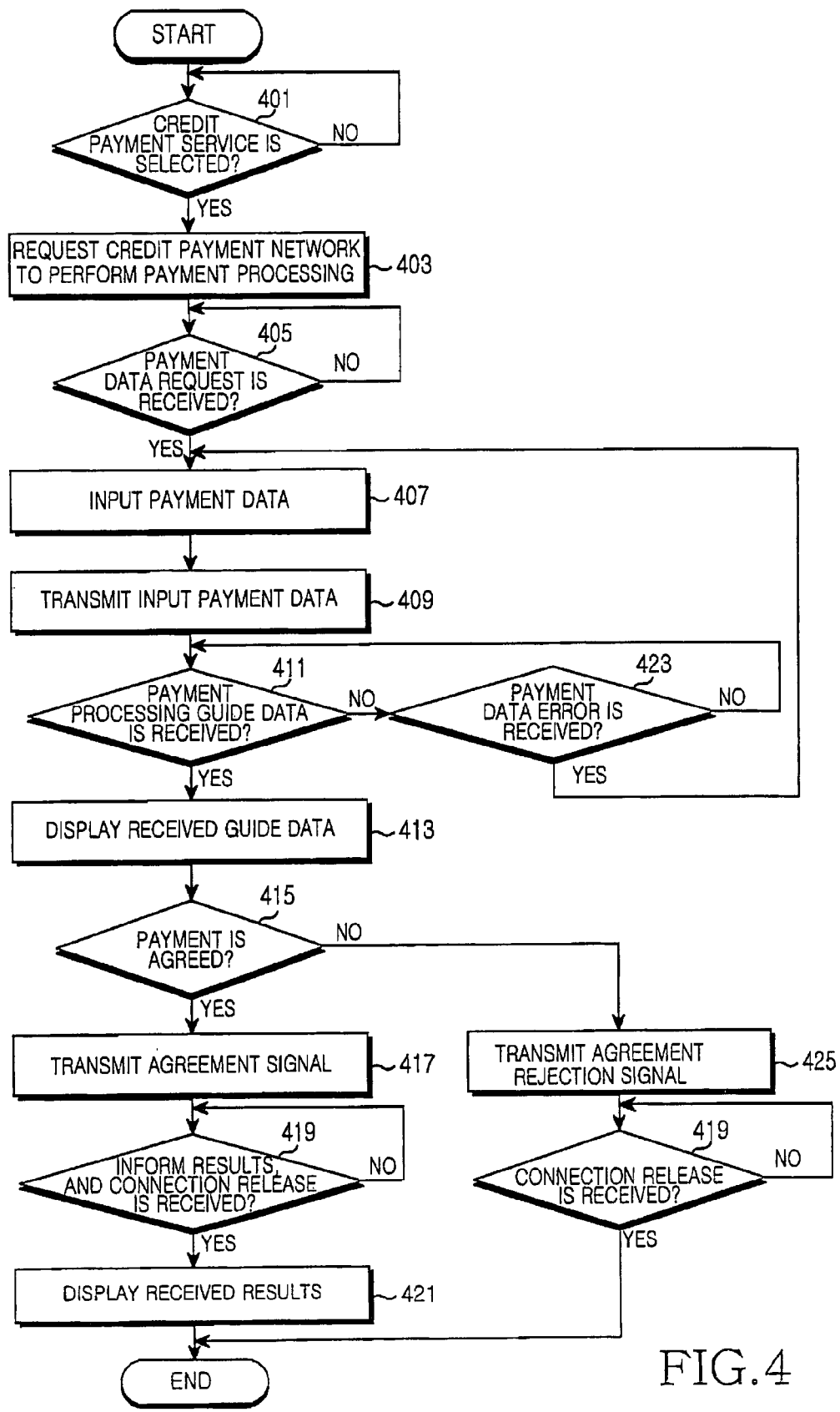
FIG. 4 is a flow chart illustrating an operating procedure of a calling terminal during credit payment between portable terminals according to the present invention.

FIG. 4 is a flow chart illustrating an operating procedure of a calling terminal during credit payment between portable terminals according to the present invention.

Referring to FIG. 4, the calling terminal 300 determines whether a credit payment service for paying a counter party's terminal a predetermined amount is selected by a user in a step 401. When it is determined that the credit payment service is selected, the calling terminal 300 transmits a message requesting credit payment to the credit payment network in a step 403.

After that, the calling terminal 300 determines whether a message requesting credit payment data is received from the credit payment network in step 405. When it is determined that the message requesting credit payment data is received, the calling terminal 300 displays a message requesting input of credit payment data to receive data regarding whether credit payment requested by a user is payment for paying an amount of money or payment requesting an amount of money, and data regarding a counter party's terminal, an amount of payment money, and a payment password for user identification in a step 407. After that, the calling terminal 300 performs tep 409 and transmits the input payment data to the credit payment network. Here, the calling terminal 300 may perform a user authentication process for the credit payment before transmitting the input payment data. If the user authentication fails, the calling terminal 300 may inform its user of the failure and/or may indicate that the credit payment service cannot be used.

After that, the calling terminal 300 determines whether messages guiding at least one payment processing method and asking whether to agree to process payment using a predetermined payment processing method are received from the credit payment network in a step 411.

When it is determined that the message guiding at least one payment processing method has not been received (for example, within a predetermined time period), the calling terminal 300 determines whether a signal indicating an error in the payment data has occurred is received in a step 423. When it is determined that a payment data error signal has been received, the calling terminal 300 returns to the step 407. Otherwise, the calling terminal 300 returns the step 411.

When it is determined the message guiding at least one payment processing method is received in the step 411, the calling terminal 300 displays the received message in the step 413 and continues to step 415. In step 415, after a user has selected one of the received payment processing methods, the calling terminal 300 determines whether to agree to process payment of the input predetermined amount of money using the selected payment processing method. Here, the payment processing methods may include a payment method using a rate of a portable terminal, a payment method using a predetermined account of a user, and/or a payment method using a credit (or debit) card.

When the user does not agree to process the payment using the selected payment processing method, the calling terminal 300 transmits a message informing non-agreement with the payment to the credit payment to the network 302 in a step 425, and performs a step 419 to determine whether a connection release message is received from the credit payment network 302. When it is determined that the connection release message has been received, the calling terminal 300 ends the method of the present invention.

On the other hand, when it is determined that the user has selected a predetermined payment processing method and has agreed to process the payment using the selected payment processing method, the calling terminal 300 transmits a message agreeing to process the requested payment using the selected payment processing method to the credit payment network 302 in a step 417.

After that, the calling terminal 300 determines whether a message informing a connection release together with a payment processing result has been received from the credit payment network 302 in a step 419. When it is determined that the payment processing result and the connection release have been received, the calling terminal 300 performs a step 421 and displays the received payment processing result and thereafter ends the credit payment service to release connection with the credit payment network.

After that, the calling terminal 300 ends the algorithm according to the present invention.

Figure 5:
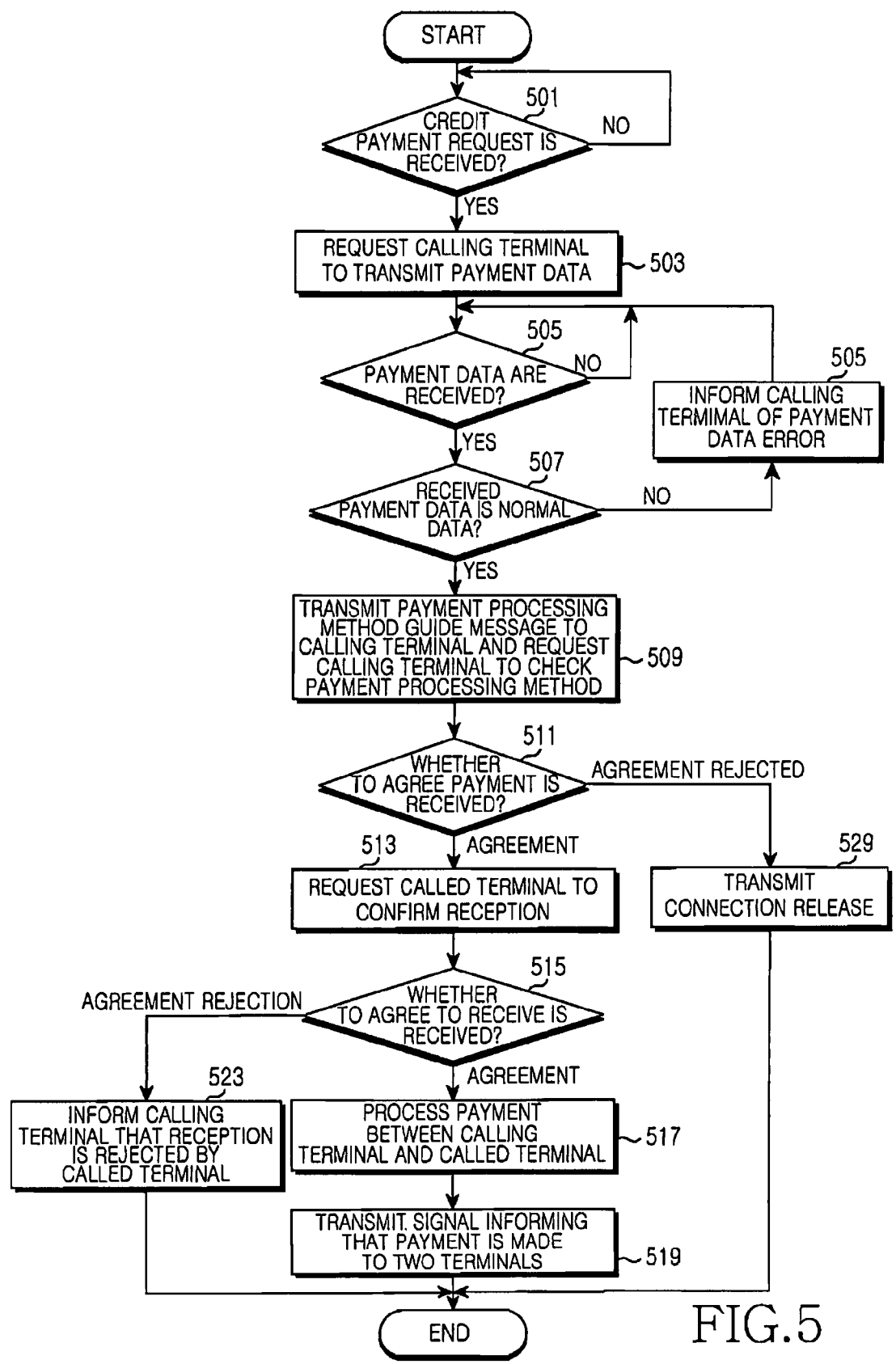
FIG. 5 is a flow chart illustrating an operating procedure of a credit payment network during credit payment between portable terminals according to the present invention.

FIG. 5 is a flow chart illustrating an operating procedure of a credit payment network during credit payment between portable terminals according to the present invention.

Referring to FIG. 5, the credit payment network 302 determines whether a credit payment request message for paying a counter party's terminal a predetermined amount (of money) is received from a predetermined terminal (e.g., the calling terminal 300) in step 501. Here, the credit payment network 302 can whether a service type of the credit payment request message received from the predetermined terminal is a service type for paying the counter party's terminal (e.g., the called terminal 304) the predetermined amount of money or a service type for requesting payment.

When it is determined that the credit payment request message is received from the predetermined terminal (calling terminal 300), the credit payment network 302 transmits a message requesting data regarding the payment to the calling terminal 300 that has requested the credit payment in step 503. For example, the credit payment network 302 can transmit a message requesting the calling terminal 300 to transmit data such as a number of a counter party's terminal for which payment is to be paid, data of user of a counter party's terminal, an amount of payment money, and/or a password for user authentication.

After that, the credit payment network 302 determines whether payment data is received from the calling terminal 300 in step 505. When it is determined that the payment data has been received, the credit payment network 302 determines whether the received payment data (e.g., a number of a counter party's terminal, user data, and a password for user authentication) coincide with prestored data of the credit payment network 302 in step 507. When it is determined that the payment data does not coincide With the prestored data of the credit payment network 302, the credit payment network 302 transmits a message informing that the payment data has an error to the calling terminal 300 in step 525, and returns to step 505.

On the other hand, when it is determined that the payment data coincides with the prestored data of the credit payment network 302, the credit payment network 302 transmits one or more payment processing methods to the calling terminal 300 in response to the requested payment, and transmits a message allowing a user to select one of the payment processing methods and requesting the user to agree to process the payment in step 509 to the calling terminal 300. Here, the payment processing methods may include a payment method using a rate of a portable terminal, a payment method using a predetermined account of a user, and a payment method using a credit card.

After that, the credit payment network 302 whether a message representing whether to agree to the payment has been received from the calling terminal 300 in step 511. When it is determined that a message informing non-agreement with the payment has been received, the credit payment network 302 transmits a message informing a connection release to the calling terminal 300 in step 529.

On the other hand, when it is determined that a message agreeing to the payment received, the credit payment network 302 checks the selected payment processing method from the received message, informs the counter party's terminal 304 (i.e., called terminal) that a payment processing is requested by the calling terminal 300, and transmits a message asking whether to receive an amount of money transmitted from the calling terminal 300 to the called terminal 304 in a step 513.

After that, the credit payment network 302 whether a message representing whether to agree to receive the amount of money has been received from the called terminal 304 in step 515. When it is determined that a message not agreeing to receive the amount of money has been received, the credit payment network 302 transmits a message informing that the reception of the amount of money is rejected by the called terminal 304 to the calling terminal 302 in step 523, and ends the method of the present invention.

On the other hand, when it is determined that a message agreeing to receive the amount of money has been received, the credit payment network 302 pays (or credits) the called terminal 302 the amount of money using the selected payment processing method in a step 517. For example, when a payment method using a rate of a portable terminal is selected by the calling terminal 300, the predetermined amount of money is added to the rate of the calling terminal 300 and the rate of the called terminal 304 decreases by the predetermined amount of money, so that the credit payment of the predetermined amount of money can be processed.

After that, the credit payment network 302 transmits the payment result to the calling terminal 300 and the called terminal 304, and releases connection with each terminal associated with the credit payment service to end the algorithm according the present invention in step 519.

Figure 6:
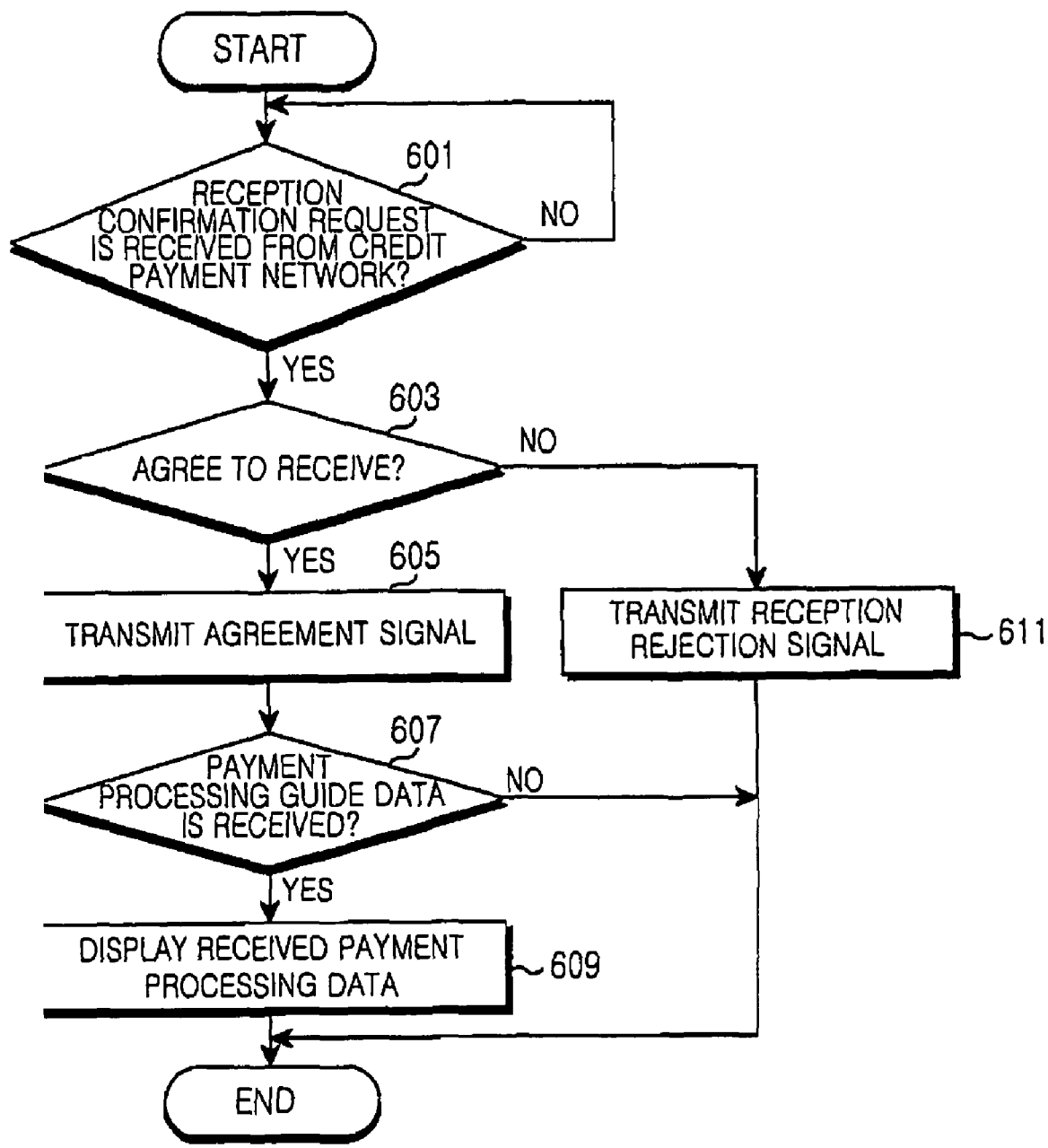
FIG. 6 is a flow chart illustrating an operating procedure of a called terminal during credit payment between portable terminals according to the present invention.

FIG. 6 is a flow chart illustrating an operating procedure of a called terminal during credit payment between portable terminals according to the present invention.

Referring to FIG. 6, the called terminal 304 determines whether a credit payment message requesting reception confirmation for an amount of money paid by a predetermined terminal has been received from the credit payment network 302 in step 601. When it is determined that the message requesting the reception confirmation has been received, the called terminal 304 displays the received message, i.e., data of the calling terminal 300 that has requested the payment processing and the amount of payment money on the display unit 206, to and afterwards determines whether a user agrees to receive the amount of money in a step 603.

When it is determined that the user has not agreed to receive the amount of money, the called terminal 304 transmits a message informing reception rejection of the amount of money to the credit payment network 302 in step 611. On the other hand, when it is determined that the user has agreed to receive the amount of money, the called terminal 304 transmits a message informing of this agreement to receive the amount of money to the credit payment network 302 in step 605. Here, the called terminal 304 can transmit/receive a message for performing user authentication to/from the credit payment network 302 in order to receive the amount of money.

After that, the called terminal 304 determines whether a payment processing result regarding the amount of money is received from the credit payment network 302 in step 607. When the payment processing result determined to have been received, the called terminal 304 displays the received payment processing result and releases connection with the credit payment network 302 to end the algorithm according to the present invention in step 609.

FIG. 7 is a flow diagram illustrating a FACILITY message transmitted/received between a calling terminal and a credit payment network according to the present invention. The message is described with reference to the description of FIG. 3 above.

Figure 8:
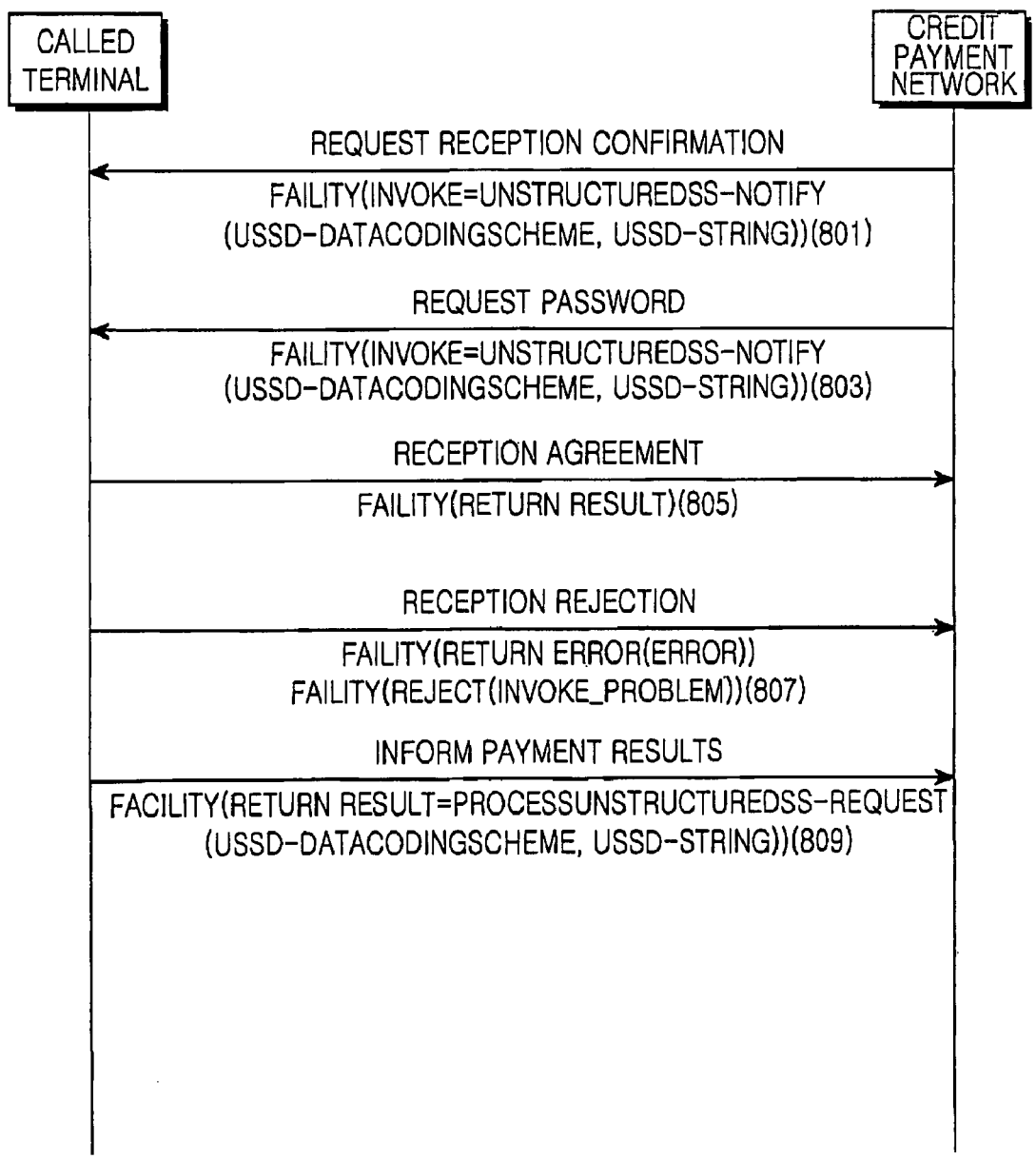
FIG. 8 is a flow diagram illustrating a FACILITY message transmitted/received between a called terminal and a credit payment network according to the present invention.

FIG. 8 is a flow diagram illustrating a FACILITY message transmitted/received between a called terminal and a credit payment network according to the present invention. The message is described with reference to the description of FIG. 3 above.

As described above, the present invention provides payment service between portable terminals using FACILITY messages defined in advance, so that portable terminals lacking a short distance communication module (e.g., IrDA or Bluetooth) or an additional chip for payment processing can perform credit payment processing between the portable terminals using a conventional service network. Also, since not only a determination routine of the portable terminal but also a confirmation procedure of a service provider can be performed, payment transparency between individuals increases.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing payment service at a portable terminal, the method comprising the steps of:
    creating a first FACILITY message requesting a credit payment process, when an event for processing a credit payment occurs; and
    transmitting the first created FACILITY message to a mobile communication network;
    wherein the first FACILITY message comprises Unstructured Supplementary Services Data (USSD).

2. The method of claim 1, further comprising:
    receiving a second FACILITY message requesting payment data from the mobile communication network; and
    creating a third FACILITY message including the requested payment data to transmit the requested payment data to the mobile communication network.

3. The method of claim 2, wherein the payment data comprises at least one of data corresponding to a counter party's terminal, a payment amount, and a password.

4. The method of claim 2, further comprising performing a user authentication process, when the second FACILITY message is received.

5. The method of claim 2, further comprising:
    receiving a fourth FACILITY message including information corresponding to one or more payment processing methods from the mobile communication network;
    creating a fifth FACILITY message including information corresponding an agreement to process the payment using one payment processing method selected from the information corresponding to the one or more payment processing methods; and
    transmitting the created fifth FACILITY message to the mobile communication network.

6. The method of claim 5, further comprising receiving the fourth FACILITY message, selecting a predetermined payment processing method using the information corresponding to the one or more payment processing methods included in the fourth FACILITY message; and displaying a window for obtaining an agreement of a user.

7. The method of claim 5, wherein the payment processing method comprises at least one of a payment method using a rate of a portable terminal, a payment method using a bank account of a user, and a payment method using a credit card.

8. The method of claim 5, further comprising receiving a sixth FACILITY message including information corresponding to a payment processing result from the mobile communication network.

9. A method for providing payment service at a mobile communication system, the method comprising the steps of:
    creating a first FACILITY message requesting payment data and transmitting the requested payment data through a mobile communication network to a calling terminal when a credit payment request message is received from the calling terminal; and
    receiving a second FACILITY message through the mobile communication network including the requested payment data from the calling terminal;
    wherein the first and second FACILITY messages comprise Unstructured Supplementary Services Data (USSD).

10. The method of claim 9, wherein the payment data comprises at least one of data corresponding to a called terminal, a payment amount, and a password.

11. The method of claim 9, further comprising checking data of a called terminal from the payment data, and determining whether a password included in the second FACILITY message corresponds with prestored data, when the second FACILITY message is received.

12. The method of claim 11, further comprising:
creating a third FACILITY message including information corresponding to at least one payment processing method and transmitting the third FACILITY message to the calling terminal; and
receiving a fourth FACILITY message including information corresponding to an agreement to process payment using a predetermined payment processing method from the calling terminal.

13. The method of claim 12, wherein the payment processing method comprises information corresponding to payment method using at least one of a payment method using a rate of a portable terminal, a predetermined account of a user, and a credit card.

14. The method of claim 12, further comprising:
creating a fifth FACILITY message requesting confirmation of credit payment processing;
transmitting fifth FACILITY message same to the called terminal; and
receiving a sixth FACILITY message representing whether to agree with the fifth FACILITY message from the called terminal.

15. The method of claim 14, further comprising processing the payment associated with the called terminal and requested by the calling terminal using the predetermined payment processing method, when the sixth FACILITY message is received.

16. The method of claim 15, further comprising creating a seventh FACILITY message informing a payment processing result, and transmitting seventh FACILITY message to the calling terminal and the called terminal, when the payment is processed.

17. A method for providing payment service at a mobile communication system, the method comprising the steps of:
receiving a first FACILITY message requesting confirmation of credit payment processing; and
creating a second FACILITY message representing whether to agree with the credit payment processing to transmit the same to a mobile communication network;
wherein the first and second FACILITY messages comprise Unstructured Supplementary Service Data (USSD).

18. The method of claim 17, further comprising checking the received message to display data regarding the requested credit payment processing, when the first FACILITY message is received.

19. The method of claim 18, wherein the data regarding the requested credit payment processing comprises at least one of data of a calling terminal and an amount of payment.

20. The method of claim 17, further comprising performing a user authentication process, when the first FACILITY message is received.

21. The method of claim 17, further comprising receiving a third FACILITY message informing a credit payment processing result from the mobile communication network.

22. An apparatus for providing payment service at a portable terminal, the apparatus comprising:
a credit payment processing unit for creating a FACILITY message corresponding to an occurring credit payment processing event and analyzing a received FACILITY message when the credit payment processing event occurs; and
a communication module for transmitting the created FACILITY message through a mobile communication network to a credit payment network and receiving the FACILITY message through the mobile communication network from the credit payment network to output the FACILITY messages to the credit payment processing unit;
wherein the FACILITY messages comprise Unstructured Supplementary Service Data (USSD).

23. The apparatus of claim 22, further comprising a user authentication unit for receiving a password to perform user authentication.

* * * * *